Patented May 14, 1935

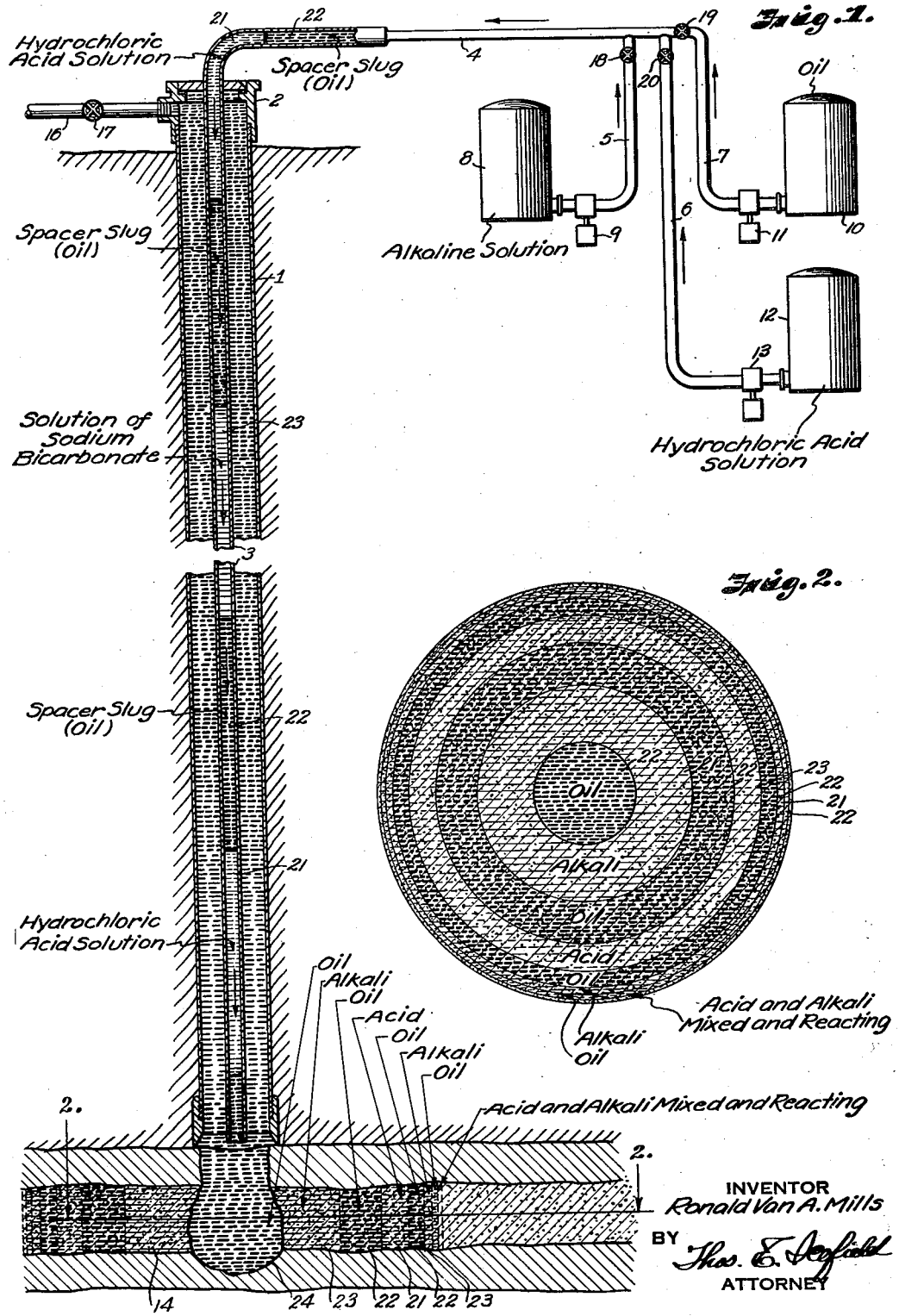

2,001,350

UNITED STATES PATENT OFFICE 2,001,350

METHOD OF TREATING OIL AND GAS WELLS

Ronald Van Auken Mills, Ponca City, Okla., assignor to Continental Oil Company, Ponca City, Okla., a corporation of Delaware Application April 20, 1934, Serial No. 721,534

1 Claim. (Cl. 166—21)

My invention relates to a method of treating oil and gas wells and more particularly to a method of injecting into oil and gas wells reacting chemical solutions.

It is known in the art that wells may be treated with the aid of chemicals. For example, it has been the practice to introduce acid and alkaline solutions into an oil or gas well and to permit the solutions to react with the generation of gas and heat. This action is chiefly local.

One object of my invention is to provide a novel method of treating wells in order to obtain a reaction in a more advantageous location.

Another object of my invention is to provide a method of treating wells with reacting agents and preventing the mixing of the reactant materials until they have penetrated into the producing formation for an appreciable distance away from the bore hole or well cavity.

Other and further objects of my invention will appear from the following description.

In general, my invention contemplates the injecting of slugs or volumes of oil or some other inert liquid into a well between alternate slugs or volumes of reacting chemical solutions as, for example, acid solutions and alkaline solutions. As the successive slugs of liquid go into the well and down through the tubing or casing, and then spread out into the producing formation, the oil or other inert liquid will act as a spacing means between the reacting liquids, keeping them apart.

As the concentric rings of oil and reactant solutions spread out in penetrating into the producing formation, the oil spacing ring will become thinner and thinner until finally it allows the reacting chemicals to come in contact with each other to produce the desired reaction. If, for example, an acid and an alkaline solution are employed, these will come in contact with each other comparatively deep in the producing formation with respect to the bore hole and react to produce gas and heat, thus causing a disturbance in the formation. The expansive force of the gas has an effect similar to that of a slow but expansive shot in the formation itself at an appreciable distance from the well cavity. In this wise, the production of a well is stimulated.

In the accompanying drawing which forms part of the instant specification and is to be read in conjunction therewith and in which like reference numerals are used to represent like parts in the various views, Figure 1 is a diagrammatic view of a section of a well fitted with one means of carrying out my invention.

Figure 2 is a sectional view taken on a line 2—2 of Figure 1.

More particularly referring now to the drawing, the drill hole is provided with the usual casing 1 fitted with a casinghead 2. The eduction tubing 3 is connected to a manifold 4 in any suitable manner. Connected to the manifold are pipes 5, 6, and 7, through which an alkaline solution, an acid solution, and an oil solution may be introduced respectively. The alkaline solution may be stored in tank 8, from which it is adapted to be pumped by pump 9. The oil solution may be stored in tank 10 from which it is adapted to be pumped by pump 11. The acid solution may be stored in tank 12 from which it is adapted to be pumped by pump 13. It will be noted that, for purposes of convenience, I will refer to the reacting solutions as acid and alkaline solutions respectively. It is to be understood, of course, that any suitable reacting solutions may be used. In practice, I prefer to use aqueous solutions of hydrochloric acid for the acid solution, and solutions of sodium carbonate or sodium bicarbonate as the alkaline solution. It will readily be understood by those skilled in the art that any alkaline carbonates or bicarbonates, or basic solutions capable of liberating gas when contacted with an acid could be used. The gas to be liberated need not necessarily be carbon dioxide. Reagents which would liberate hydrogen, oxygen, or other gases when treated with suitable reactants, could be used. While hydrochloric acid is convenient, any suitable acid could be used, depending upon the particular type of reactant. The producing formation is represented by reference numeral 14.

In operation, the well and the well casing are completely filled with oil pumped in through pipe 16 and the valve 17 in line 16 is closed. Acid solution from tank 12 is pumped by pump 13 through line 6, valves 18 and 19 being closed and valve 20 being opened. Then valve 20 is closed and valve 19 is opened, permitting pump 11 to pump oil through line 7 into the manifold 4. Then valve 19 is closed and valve 18 is opened permitting pump 9 to pump the alkaline carbonate solution through line 5 into manifold 4. Then valve 18 is closed and valve 19 opened permitting a slug of oil to be pumped behind the alkaline solution. Then valve 19 is closed and valve 20 is opened and the process repeated. It will be seen by reference to the drawing that alternate slugs of acid solution 21, oil 22, and alkaline solution 23 find their way through eduction tubing 3 into the well cavity 24. The oil holds the reactant solutions apart, the mechanical pressure of the pumps forcing the alternate slugs of acid, oil, alkaline solution into the formation in approximately concentric rings, as can readily be seen by reference to Figure 2. As the concentric rings spread, they become thinner and thinner. This thinning process continues as the slugs penetrate into the formation. Eventually the separating ring of oil becomes sufficiently thin to permit the reacting agents to commingle, evolving gas and heat deep in the formation and clearing it so that oil imprisoned in the producing layer may find its way into the well. It will also be readily appreciated that the distance from the well cavity 24 at which the desired reaction takes place will be determined by the thickness of the spacing slugs. Small spacing slugs will permit the mixing and reacting of the reagents at a point in the formation close to the well. On the other hand, large spacing slugs will require that the reagents penetrate to a deeper point in the formation before the spacing liquid fails in its function and permits the contacting and reacting of the reagents.

It will also be obvious that, by using an excess of acid over that necessary to react with the alkaline reagent, the advantages of ordinary acid treating such as cleaning out and enlarging the pores in acid soluble productive formations are preserved.

The generation of gas in the formation itself is accomplished by this process. It is especially beneficial in acid treating certain formations such as sands and siliceous dolomites. These formations are those which do not readily yield to ordinary acid treatment. The generation of carbon dioxide gas resulting when the acid attacks a limestone formation is an important factor in the success of acid treatment of these limestone formations. Inasmuch as ordinary acid treatment will not produce sufficient gas in dolomitic and siliceous formations, it will be readily appreciated that, with the aid of my process, the same advantages which accrue in the acid treating of limestone formations, are achieved in dolomitic and siliceous formations, which are not ordinarily benefited by ordinary acid treating.

The generation of gas pressure in a productive formation at distances from the well cavity tends to force the reagents further into the formation, thus increasing the effectiveness of the treatment. This is especially true in dolomitic and limestone formations in which a relatively large slug of acid (an excess of acid) is followed by alternate slugs of alkaline and acid solutions. In this manner the alternate slugs of acid and alkaline solutions will create a pressure at some distance from the well cavity, which will permit the driving of the excess acid further into the formation.

The injection of successive slugs of acid and alkaline reagents separated by slugs of an inert spacing liquid causes both the repetition and the prolongation of the beneficial effects of the chemical reaction in the productive formation.

Due to the fact that the well casing is loaded with oil, the treating materials will be forced into the formation. It will readily be appreciated, of course, that, instead of loading the casing with oil, my process may be practiced by using packers to prevent the passing of the material upward into the well instead of into the producing formation.

It will be seen that I have accomplished the objects of my invention. I have provided a method of chemically treating oil and gas wells which will permit the treatment to take place in the more advantageous point in the formation. In this manner, I not only obtain improved results, but the quantity of reagents necessary to produce a given result is greatly lessened. The treatment, according to my method, is progressive and prolonged. In introducing a given quantity of acid and oil into a well, the effect is too rapid and too evanescent to obtain the results obtained by my method.

It will be understood that certain features and subcombinations are of utility and may be employed without reference to other features and sub-combinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

A method of chemically treating wells including the steps of injecting a chemical into the well, then injecting a charge of oil, then injecting a second chemical capable of reacting with said first chemical to produce heat and/or gas and forcing the chemicals separated by the oil into the producing formation in widening substantially concentric rings until the chemicals contact and react.

RONALD VAN AUKEN MILLS.